(12) United States Patent
Jang et al.

(10) Patent No.: US 11,698,835 B2
(45) Date of Patent: Jul. 11, 2023

(54) MEMORY AND OPERATION METHOD OF MEMORY

(71) Applicant: SK hynix Inc., Gyeonggi-do (KR)

(72) Inventors: Munseon Jang, San Jose, CA (US); Hoi Ju Chung, San Jose, CA (US); Jang Ryul Kim, San Jose, CA (US)

(73) Assignee: SK hynix Inc., Gyeonggi-do (KR)

( * ) Notice: Subject to any disclaimer, the term of this patent is extended or adjusted under 35 U.S.C. 154(b) by 71 days.

(21) Appl. No.: 17/329,681

(22) Filed: May 25, 2021

(65) Prior Publication Data

US 2021/0397515 A1 Dec. 23, 2021

Related U.S. Application Data

(60) Provisional application No. 63/080,850, filed on Sep. 21, 2020, provisional application No. 63/042,230, filed on Jun. 22, 2020.

(51) Int. Cl.
*G11C 29/42* (2006.01)
*G06F 11/10* (2006.01)
*G06F 3/06* (2006.01)

(52) U.S. Cl.
CPC ........ *G06F 11/1076* (2013.01); *G06F 3/0619* (2013.01); *G06F 3/0659* (2013.01); *G06F 3/0673* (2013.01)

(58) Field of Classification Search
CPC .. G06F 11/1076; G06F 3/0619; G06F 3/0659; G06F 3/0673; G06F 11/1048; G11C 29/42; G11C 7/1006; G11C 7/1051; G11C 8/10; G11C 29/52
USPC ........................................................ 714/764
See application file for complete search history.

(56) References Cited

U.S. PATENT DOCUMENTS

| | | | | |
|---|---|---|---|---|
| 6,199,139 B1* | 3/2001 | Katayama | ............. | G06F 1/3275 714/764 |
| 8,245,101 B2* | 8/2012 | Olbrich | ................... | G06F 13/28 714/6.24 |
| 10,521,293 B2 | 12/2019 | Cha et al. | | |
| 10,769,013 B1* | 9/2020 | MacLaren | ............. | G06F 3/0619 |
| 2004/0163027 A1* | 8/2004 | MacLaren | ............. | G06F 11/108 714/764 |
| 2005/0036371 A1* | 2/2005 | Kushida | .............. | G06F 11/1008 365/201 |
| 2005/0204212 A1* | 9/2005 | Noguchi | ................ | G11C 29/76 714/710 |
| 2013/0275830 A1* | 10/2013 | Park | ...................... | H03M 13/09 714/758 |
| 2014/0063996 A1* | 3/2014 | Takahashi | ................ | G11C 7/22 365/200 |
| 2020/0135292 A1* | 4/2020 | Kim | ..................... | G11C 29/783 |

* cited by examiner

*Primary Examiner* — Albert Decady
*Assistant Examiner* — Enam Ahmed
(74) *Attorney, Agent, or Firm* — IP & T Group LLP

(57) ABSTRACT

A method for operating a memory includes: reading data and an error correction code from a memory core; correcting an error of the read data based on the read error correction code to produce error-corrected data; generating new data by replacing a portion of the error-corrected data with write data, the portion becoming a write data portion; generating a new error correction code based on the new data; and writing the write data portion of the new data and the new error correction code into the memory core.

18 Claims, 11 Drawing Sheets

FIG. 3

| 301 | DATA" | | ECC |
|---|---|---|---|
| | MSG0 (128bit) | MSG1 (128bit) | 32bit |

| 303 | DATA' | |
|---|---|---|
| | MSG0' (128bit) | MSG1' (128bit) |

| 305 | DATA" | |
|---|---|---|
| | WR DATA (128bit) | MSG1' (128bit) |

| 307 | DATA" | | ECC |
|---|---|---|---|
| | WR DATA (128bit) | MSG1' (128bit) | 32bit |

FIG. 4

| | DATA'' | | ECC |
|---|---|---|---|
| 401 | MSG0 (128bit) | MSG1 (128bit) (4bit errors) | 32bit |

| | DATA' | |
|---|---|---|
| 403 | MSG0' (128bit) | MSG1' (128bit) (5bit errors) |

| | DATA'' | |
|---|---|---|
| 405 | WR DATA (128bit) | MSG1' (128bit) (5bit errors) |

| | DATA'' | | ECC |
|---|---|---|---|
| 407 | WR DATA (128bit) | MSG1' (128bit) (5bit errors) | 32bit |

FIG. 6

| DATA" | | ECC |
|---|---|---|
| MSG0 (128bit) | MSG1 (128bit) | 32bit |

601

| DATA' | |
|---|---|
| MSG0' (128bit) | MSG1' (128bit) |

603

| DATA" | |
|---|---|
| WR DATA (128bit) | MSG1' (128bit) |

605

| DATA" | | ECC |
|---|---|---|
| WR DATA (128bit) | MSG1' (128bit) | 32bit |

607

| DATA" | | ECC |
|---|---|---|
| WR DATA (128bit) | No Write (masking) | 32bit |

| DATA'' | | ECC |
|---|---|---|
| MSG0 (128bit) | MSG1 (128bit) | 32bit |

901

| DATA' | |
|---|---|
| MSG0' (128bit) | MSG1' (128bit) |

903

| DATA'' | |
|---|---|
| WR DATA (128bit) | MSG1' (128bit) |

905

| DATA'' | | ECC |
|---|---|---|
| WR DATA (128bit) | MSG1' (128bit) | 32bit |

| DATA" | | ECC |
|---|---|---|
| MSG0 (128bit) | MSG1 (128bit) | 32bit |

1101

| DATA' | |
|---|---|
| MSG0' (128bit) | MSG1' (128bit) |

1103

| DATA" | |
|---|---|
| WR DATA (128bit) | MSG1' (128bit) |

1105

| DATA" | | ECC |
|---|---|---|
| WR DATA (128bit) | MSG1' (128bit) | 32bit |

1107

| NEW_WR_DATA | |
|---|---|
| WR DATA (128bit) | MSG1 (128bit) |

1109

MEMORY AND OPERATION METHOD OF MEMORY

CROSS-REFERENCE TO RELATED APPLICATIONS

The present application claims benefit of U.S. Provisional Application No. 63/042,230, filed on Jun. 22, 2020 and U.S. Provisional Application No. 63/080,850, filed on Sep. 21, 2020 the entire contents of which are incorporated herein by reference.

BACKGROUND

1. Field

Various embodiments of the present invention relate to a memory.

2. Description of the Related Art

In the early stage of the semiconductor memory device industry, there were many originally good dies on the wafers, which means that memory chips were produced with no defective memory cells through a semiconductor fabrication process. However, as the capacity of memory devices increases, it became difficult to fabricate a memory device that does not have any defective memory cells. Currently, it may be said that there is substantially no chance that a memory device may be fabricated without any defective memory cells. To address this issue, a repair method of including redundant memory cells in a memory device and replacing defective memory cells with the redundant memory cells is being used.

Another method includes an error correction circuit (ECC circuit) for correcting errors in a memory system, which is used to correct errors occurring in memory cells and errors occurring when data are transferred during a read operation and a write operation of the memory system.

SUMMARY

Embodiments of the present invention are directed to a technology that may reduce the number of errors in a memory.

In accordance with an embodiment of the present invention, a method for operating a memory includes: reading data and an error correction code from a memory core; correcting an error of the read data based on the read error correction code to produce error-corrected data; generating new data by replacing a portion of the error-corrected data with write data, the portion becoming a write data portion; generating a new error correction code based on the new data; and writing the write data portion of the new data and the new error correction code into the memory core.

In accordance with another embodiment of the present invention, a method for operating a memory includes: reading first data, second data and an error correction code from a memory core; correcting an error of the read first data and the read second data based on the read error correction code; generating new data by combining the first data whose error is corrected and write data; generating a new error correction code based on the new data; and writing the error-corrected first data, the read second data, and the new error correction code into the memory core.

In accordance with yet another embodiment of the present invention, a memory includes: a memory core; an access circuit suitable for accessing the memory core; an error correction circuit suitable for correcting an error; an error correction code generation circuit suitable for generating an error correction code; and a modify circuit suitable for modifying data, wherein, during a read modify write (RMW) operation: the error correction circuit corrects an error of data read from the memory core based on the error correction code that is read from the memory core through the access circuit; the modify circuit generates new data by replacing, with write data, a portion of the read data whose error is corrected by the error correction circuit, the portion becoming a write data portion; the error correction code generation circuit generates a new error correction code based on the new data; the access circuit writes the new data and the new error correction code into the memory core when a first mode is set; and the access circuit writes the write data portion of the new data and the new error correction code into the memory core when a second mode is set.

In accordance with still another embodiment of the present invention, a memory includes: a memory core; an access circuit suitable for accessing the memory core; an error correction circuit suitable for correcting an error; an error correction code generation circuit suitable for generating an error correction code; and a first modify circuit and a second modify circuit suitable for modifying data, wherein, during a read modify write (RMW) operation: the error correction circuit corrects errors of first data and second data that are read from the memory core based on the error correction code that is read from the memory core through the access circuit; the first modify circuit generates new data by combining the first data whose errors are corrected by the error correction circuit with write data; the error correction code generation circuit generates a new error correction code based on the new data, the access circuit writes the new data and the new error correction code into the memory core when a first mode is set, the second modify circuit generates new write data by combining the first data whose errors are corrected with the read second data when a second mode is set, the access circuit writes the new write data and the new error correction code into the memory core when the second mode is set.

In accordance with still another embodiment of the present invention, a method for operating a memory includes: reading, respectively from first to third regions, first and second pieces of data and a first error correction code (ECC) generated on the basis of an original version of the first and second pieces; performing, based on the first ECC, an error-correcting operation on the first and second pieces to generate third and fourth pieces of data respectively corresponding to the first and second pieces; generating a second ECC based on the fourth piece and a fifth piece of data corresponding to the first piece; writing, respectively into the first and third regions, the fifth piece and the second ECC without writing the fourth piece into the second region.

The writing may include masking the fourth piece.

The writing may include writing the second piece back into the second region.

BRIEF DESCRIPTION OF THE DRAWINGS

FIGS. 3 and 4 explain the first mode of the RMW operation.

FIG. 6 explains the second mode of the RMW operation.

FIG. 9 describes the first mode of the RMW operation.

FIG. 11 describes the second mode of the RMW operation.

DETAILED DESCRIPTION

Figure 1:
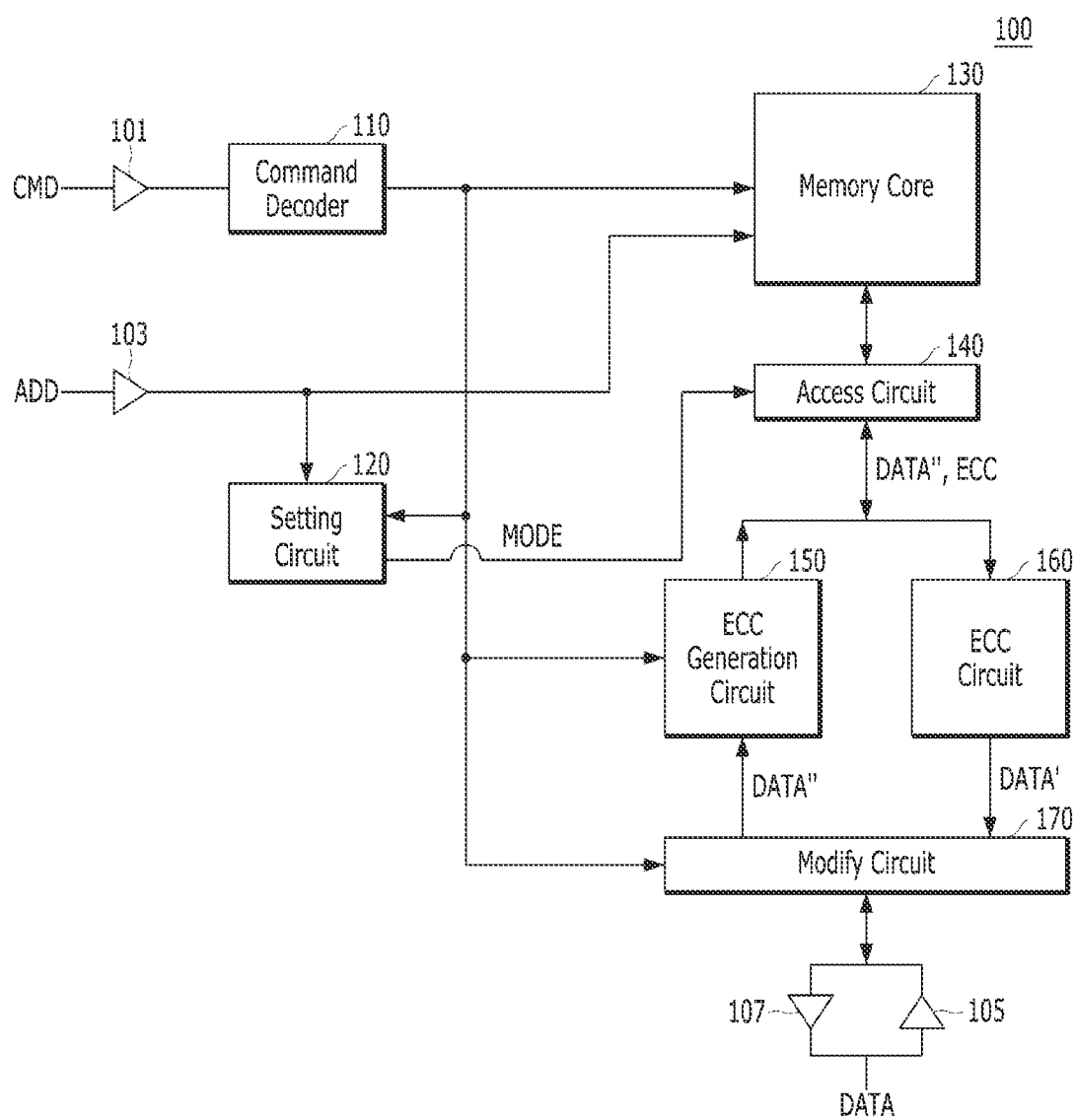
FIG. 1 is a block diagram illustrating a memory 100 in accordance with an embodiment of the present invention.

Various embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 is a block diagram illustrating a memory 100 in accordance with an embodiment of the present invention.

Referring to FIG. 1, the memory 100 may include a command receiving circuit 101, an address receiving circuit 103, a data receiving circuit 105, a data transferring circuit 107, a command decoder 110, a setting circuit 120, a memory core 130, an access circuit 140, an error correction code generation circuit 150, an error correction circuit 160, and a modify circuit 170.

The command receiving circuit 101 may receive a command CMD transferred from a memory controller. A command CMD may include multi-bit signals. The address receiving circuit 103 may receive an address ADD transferred from the memory controller. The address ADD may include multi-bit signals. The data receiving circuit 105 may receive data DATA transferred from the memory controller, and the data transferring circuit 107 may transfer data DATA to the memory controller. The data DATA may be of multiple bits. During a write operation, data DATA may be transferred from the memory controller to the memory 100, and during a read operation, data DATA may be transferred from the memory 100 to the memory controller.

The command decoder 110 may decode the command CMD received through the command receiving circuit 101 to determine what operation the memory controller directed the memory 100 to perform, and thus the constituent elements of the memory 100 may be controlled accordingly.

The setting circuit 120 may perform diverse setting operations necessary for an operation of the memory 100. When a setting command (e.g., an MRS command) is recognized as a result of the command decoding in the command decoder, the setting circuit 120 may perform a setting operation based on the address received by the address receiving circuit 103. The setting circuit 120 may also be referred to as a mode register set (MRS) circuit. A mode signal MODE output from the setting circuit 120 may be a signal related to a read-modify-write (RMW) operation, and one mode that is related to the RMW operation between a first mode and a second mode may be set based on the logic level of the mode signal MODE.

The memory core 130 may be a region for storing data in the memory 100. The memory core 130 may include a cell array including a plurality of memory cells, a row decoder for selecting a row to be accessed in the cell array, a bit line sense amplifier array for amplifying the data of the row selected in the cell array, and a column decoder for selecting columns to be accessed in the cell array.

The access circuit 140 may be a circuit for accessing the memory core 130. The access circuit 140 may transfer data and an error correction code to the memory core 130 during a write operation, and may receive the data and the error correction code from the memory core 130 during a read operation. The access circuit 140 may include a plurality of write drivers for transferring data to the columns that are selected in the memory core 130 and a plurality of sense amplifiers for receiving data from the columns selected in the memory core 130 (which may also be referred to as input/output (IO) sense amplifiers). During the RMW operation, the access unit 140 may differently operate according to the logic level of the mode signal MODE, that is, according to the first and second modes, which will be described in detail with reference to FIGS. 2 to 6.

The error correction code generation circuit 150 may generate an error correction code ECC based on data DATA" during a write operation of writing the data DATA" into the memory core 130. The error correction code generation circuit 150 may generate, by encoding the data DATA", an error correction code ECC for correcting an error of the data DATA" during a read operation of reading the data DATA" from the memory core 130. During the write operation, only the error correction code ECC may be generated, and no error correction operation may be performed. Therefore, the data DATA" input to the error correction code generation circuit 150 may be the same as the data DATA" output from the error correction code generation circuit 150.

The error correction circuit 160 may correct an error of the data DATA" that are read from the memory core through the access circuit 140 based on the error correction code ECC that is read from the memory core through the access circuit 140 during a read operation. Here, "correcting an error" may mean detecting an error of the data DATA" based on the error correction code ECC and, when an error is detected, correcting the detected error.

The modify circuit 170 may be a circuit for modifying data during a RMW operation. During a RMW operation, the modify circuit 170 may generate the data DATA" to be written by combining the write data WR DATA that are transferred from the outside of the memory 100 with the data DATA' that are error-corrected from the data DATA" read from the memory 100. During a normal write operation and a normal read operation, which is not a RMW operation, data may bypass the modify circuit 170. That is, during a normal write operation, the data DATA and the data DATA" may be the same, and during a normal read operation, the data DATA' and the data DATA may be the same.

Since an error correction code ECC is stored in the memory core 130 of the memory 100 supporting a RMW operation, in an embodiment, the initialization data (e.g., '0') may be written in all regions of the memory core 130 during an initialization operation of the memory 100.

Figure 2:
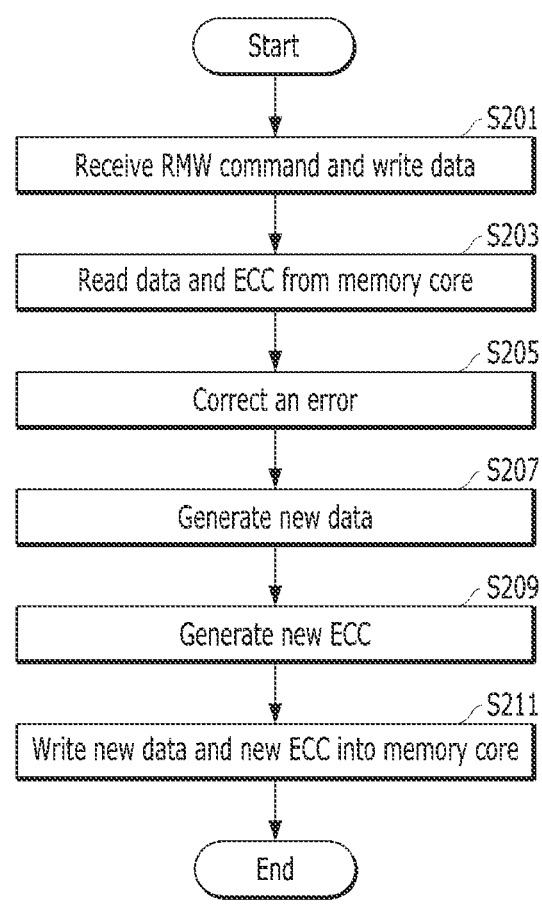
FIG. 2 is a flowchart describing a RMW operation of the memory 100 when a first mode is set by a setting circuit 120.

FIG. 2 is a flowchart describing a RMW operation of the memory 100 when a first mode is set by the setting circuit 120. FIGS. 3 and 4 describe the first mode of the RMW operation.

Referring to FIGS. 2 and 3, a command CMD directing a RMW operation and write data WR DATA may be applied to the memory 100 in operation S201. The command CMD may be transferred to the command decoder 110 through the command receiving circuit 101 and the command decoder 110 may decode the command CMD to identify the command CMD as directing the RMW operation. The write data WR DATA may be received by the data receiving circuit 105. An address ADD for designating a region in which a RMW operation is to be performed in the memory core 130 may be received through the address receiving circuit 103.

The data DATA" and the error correction code ECC may be read from the memory core 130 in operation S203. A region to be accessed in the memory core 130 may be selected based on the address ADD, and the data DATA" and the error correction code ECC may be read from the selected region of the memory core 130 through the access circuit 140. In FIG. 3, '301' may denote the data DATA" and the error correction code ECC that are read from the selected region of the memory core 130. Referring to '301' of FIG. 3, it may be seen that the data DATA" include two messages MSG0 and MSG1 each of which includes 128 bits, while the error correction code ECC includes 32 bits.

An error of the data DATA" may be corrected based on the error correction code ECC in operation S205. The error correction circuit 160 may correct an error of the data DATA" based on the error correction code ECC which is transferred from the access circuit 140. In FIG. 3, '303' may represent error-corrected data DATA'.

A portion of the error-corrected data DATA' may be replaced with write data WR DATA to generate new data DATA" in operation S207. The modify circuit 170 may generate the new data DATA" based on the error-corrected data DATA' and the write data WR DATA input from the outside of the memory 100. Since other data DATA" that are different from the data DATA' are generated by the modify circuit 170, this other data DATA" is referred to as new data DATA". In FIG. 3, '305' may represent the new data DATA". Referring to '305', it may be seen that the new data DATA" are generated as the error-corrected message MSG0' of the error-corrected data DATA' is replaced with the write data WR DATA. Here, the write data WR DATA may be received through the data receiving circuit 105 in the operation S201. During a normal write operation, the write data WR DATA input from the outside of the memory 100 may be 256 bits, but the write data WR DATA may be 128 bits during a modify write operation.

In operation S209, a new error correction code ECC may be generated based on the new data DATA" of operation S207. The error correction code generation circuit 150 may generate the new error correction code ECC based on the new data DATA" generated by the modify circuit 170 in operation S207. Here, since another error correction code is newly generated based on the new data, this another error correction code is referred to as the new error correction code ECC. In FIG. 3, '307' may represent the new data DATA" and the new error correction code ECC which is generated based on the new data DATA" in operation S209.

The new data DATA" and the new error correction code ECC may be written into the memory core 130 in operation S211. The new data DATA" and the new error correction code ECC may be transferred to the memory core 130 by the access circuit 140, and the new data DATA" and the new error correction code ECC may be written into the region of the memory core 130 that is selected according to the address ADD. The region in the memory core 130 that is written in the operation S211 may be the same as the region in the memory core 130 that is read in the operation S203.

The RMW operation in the first mode as described in FIG. 2 may cause a problem of continuously increasing the number of errors when there are many errors.

In FIG. 4, '401' may represent that there is an error of 4 bits in the data DATA" that are read in the operation S203. Referring to '401', it may be seen that there is a 4-bit error in the message MSG1 of the data DATA". Here, the error of 4 bits exceeds the error correction capability of the error correction circuit 160.

In FIG. 4, '403' may represent the data DATA' after the error correction operation in the operation S205 is performed. Since there is the error exceeding the error correction capability of the error correction circuit 160 in '401', the error-correction operation of the error correction circuit 160 may even worsen the error of the data DATA" read in operation S203. As a result, the number of the bits of the error may increase to 5 bits in '403'.

In FIG. 4, '405' may represent the new data DATA' generated by the modify circuit 170 in the operation S207. The new data DATA" may also include a 5-bit error.

In FIG. 4, '407' may represent that the new error correction code ECC generated by the error correction code generation circuit 150 is merged with the new data DATA" in the operation S209. '407' may be written into the memory core 130 as it is. That is, data including the 5-bit error and the error correction code 407 may be written into the memory core 130 as they are.

Referring to FIG. 4, when there are many errors, the number of errors stored in the memory core 130 may be increased by a RMW operation. When a RMW operation is repeatedly performed in the same region, the number of errors may continue to increase.

Figure 5:
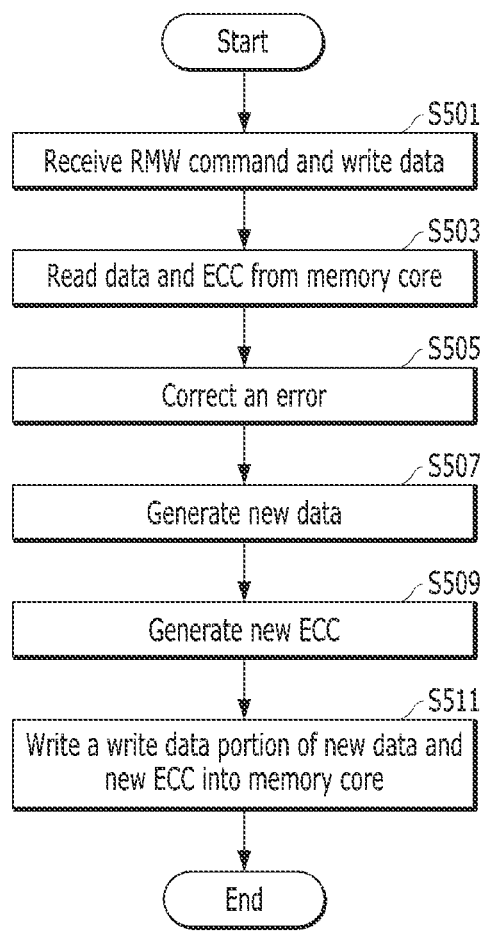
FIG. 5 is a flowchart describing a RMW operation of the memory 100 when a second mode is set by the setting circuit 120.

FIG. 5 is a flowchart describing a RMW operation of the memory 100 when a second mode is set by the setting circuit 120. FIG. 6 describes the second mode of the RMW operation.

Referring to FIGS. 5 and 6, a command CMD directing a RMW operation and write data WR DATA may be applied to the memory 100 in operation S501. The command CMD may be transferred to the command decoder 110 through the command receiving circuit 101 and the command decoder 110 may decode the command CMD to identify the command CMD as directing the RMW operation. The write data WR DATA may be received by the data receiving circuit 105. An address ADD for designating a region in which a RMW operation is to be performed in the memory core 130 may be received through the address receiving circuit 103.

Data DATA" and an error correction code ECC may be read from the memory core 130 in operation S503. A region to be accessed in the memory core 130 may be selected based on the address ADD, and the data DATA" and an error correction code ECC may be read from the selected region of the memory core 130 through the access circuit 140. In FIG. 6, '601' may represent the data DATA" and the error correction code ECC that are read from the selected region of the memory core 130. Referring to '601' of FIG. 6, it may be seen that the data DATA" include two messages MSG0 and MSG1 each of which includes 128 bits, and the error correction code ECC may include 32 bits.

An error of the data DATA" may be corrected based on the error correction code ECC in operation S505. The error correction circuit 160 may correct an error of the data DATA" based on the error correction code ECC transferred from the access circuit 140. In FIG. 6, '603' may represent error-corrected data DATA'.

A portion of the error-corrected data DATA' may be replaced with write data WR DATA to generate new data DATA" in operation S507. The modify circuit 170 may generate the new data DATA" based on the error-corrected data DATA' and the write data WR DATA input from the outside of the memory 100. Since other data DATA" that are different from the data DATA' are generated by the modify circuit 170, this other data DATA" is referred to as new data DATA". In FIG. 6, '605' may represent new data DATA". Referring to '605', it may be seen that the new data DATA" are generated as the error-corrected message MSG0' of the error-corrected data DATA' is replaced with the write data WR DATA. Here, the write data WR DATA may be the one received through the data receiving circuit 105 in the operation S501. During a normal write operation, the write data WR DATA input from the outside of the memory 100 may include 256 bits, but during a modify write operation, the write data WR DATA may include 128 bits.

In operation S509, a new error correction code ECC may be generated based on the new data DATA" of operation S507. The error correction code generation circuit 150 may generate the new error correction code ECC based on the new data DATA" generated by the modify circuit 170 in operation S507. Herein, since another error correction code is newly generated based on the new data, this another error correction code is referred to as the new error correction code ECC. In FIG. 6, '607' may represent the new data DATA" and the new error correction code ECC which is generated based on the new data DATA" in operation S509.

Now, the write data portion WR DATA of the new data DATA", and the new error correction code ECC may be written into the memory core 130 in operation S511. Since the second mode is set by the setting circuit 120, the access circuit 140 may write not the whole new data DATA" but the write data portion WR DATA of the new data DATA" and the new error correction code ECC, into the memory core 130. That is, the message MSG1', which is obtained by correcting an error of the message MSG1 read from the memory core 130 in the operation S503, may not be written back to the memory core 130 but may be masked or discarded. In FIG. 6, '609' may represent a write operation is performed in the memory core 130 in the operation S511. Referring to '609', it may be seen that only the write data WR DATA input in the operation S501 and the new error correction code ECC are written into the memory core 130. The region of the memory core 130 that is written in the operation S511 may be the same as the region of the memory core 130 read in the operation S503.

Referring to FIGS. 5 and 6, when the second mode is set, data read from the memory core 130 during a RMW operation are not written back to the memory core 130 again. Therefore, it is possible to prevent errors from being accumulated and increasing. However, in the second mode, even though the read data has errors within the error-correction capability of the error correction circuit 160, the read data, especially the message MSG1 of the above example, may not be written back again despite the error correction.

When there are a few errors in the data stored in the memory core 130, it may be advantageous to perform a RMW operation in the first mode, and when there are many errors in the data stored in the memory core 130, it may be advantageous to perform a RMW operation in the second mode.

Figure 7:
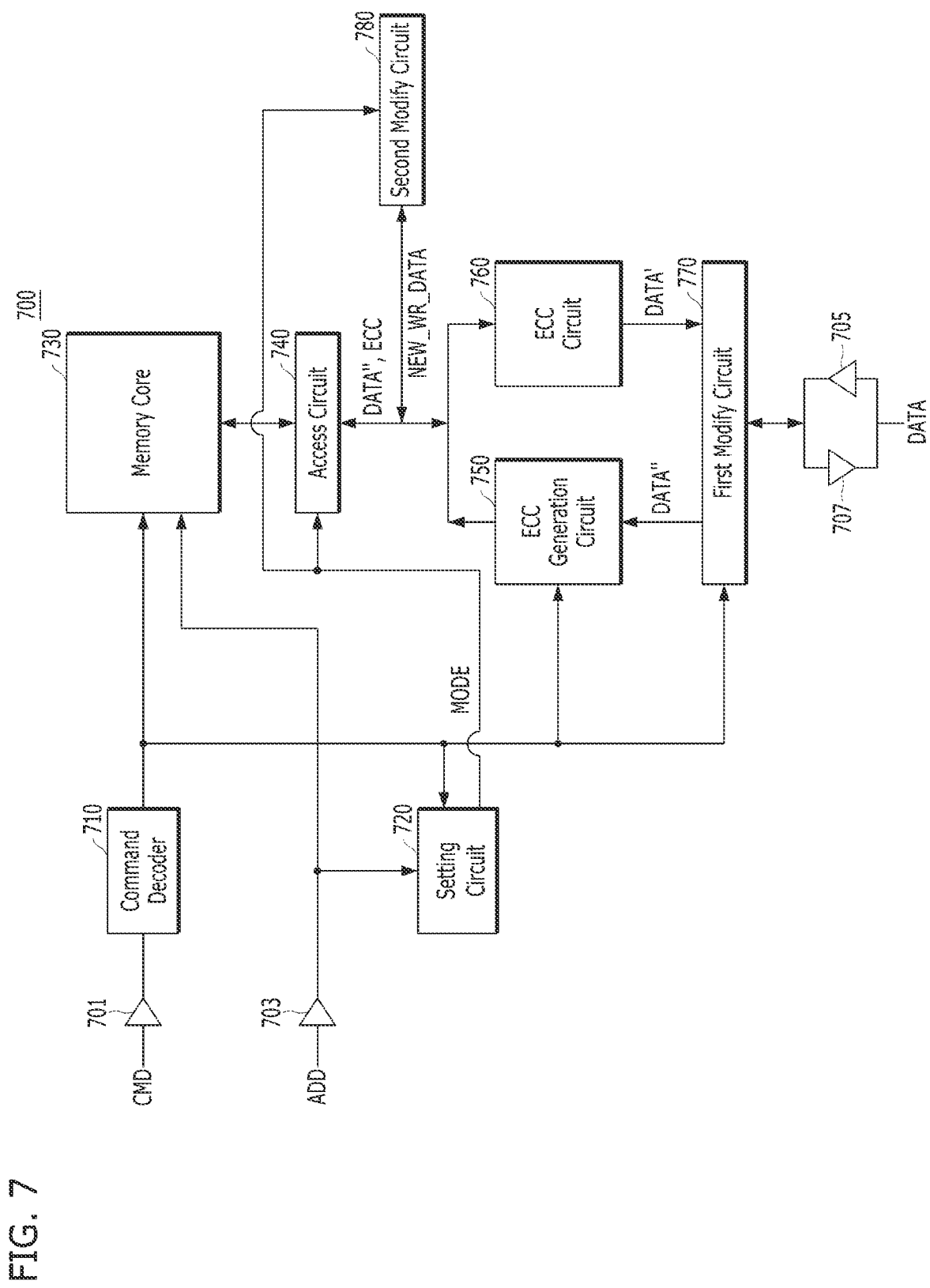
FIG. 7 is a block diagram illustrating a memory 700 in accordance with another embodiment of the present invention.

FIG. 7 is a block diagram illustrating a memory 700 in accordance with another embodiment of the present invention.

Referring to FIG. 7, the memory 700 may include a command receiving circuit 701, an address receiving circuit 703, a data receiving circuit 705, a data transferring circuit 707, a command decoder 710, a setting circuit 720, a memory core 730, an access circuit 740, an error correction code generation circuit 750, an error correction circuit 760, a first modify circuit 770, and a second modify circuit 780.

The command receiving circuit 701 may receive a command CMD transferred from a memory controller. The command CMD may include multi-bit signals. The address receiving circuit 703 may receive an address ADD which is transferred from the memory controller. The address ADD may include multi-bit signals. The data receiving circuit 105 may receive data DATA that are transferred from the memory controller, and the data transferring circuit 707 may transfer data DATA to the memory controller. The data DATA may include multiple bits. During a write operation, data DATA may be transferred from the memory controller to the memory 700, and during a read operation, data DATA may be transferred from the memory 700 to the memory controller.

The command decoder 710 may decode the command CMD received through the command receiving circuit 701 to find out what operation the memory controller directed the memory 700 to perform, and thus, the constituent elements of the memory 700 may be controlled accordingly.

The setting circuit 720 may perform diverse setting operations required for an operation of the memory 700. When a setting command (e.g., an MRS command) is recognized as a result of decoding the command in the command decoder, the setting circuit 720 may perform a setting operation based on the address received by the address receiving circuit 703. The setting circuit 720 may also be referred to as a mode register set (MRS) circuit. The mode signal MODE output from the setting circuit 720 may be a signal related to a read-modify-write (RMW) operation, and one mode related to a RMW operation between the first mode and the second mode may be set.

The memory core 730 may be a region for storing data in the memory 700. The memory core 730 may include a cell array including a plurality of memory cells, a row decoder for selecting a row to be accessed in the cell array, a bit line sense amplifier array for amplifying the data of the row selected from the cell array, and a column decoder for selecting the columns to be accessed in the cell array.

The access circuit 740 may be a circuit for accessing the memory core 730. The access circuit 740 may transfer data and an error correction code to the memory core 730 during a write operation, and may receive the data and the error correction code from the memory core 730 during a read operation. The access circuit 740 may include a plurality of write drivers for transferring data to the columns selected from the memory core 730, and a plurality of sense amplifiers for receiving data from the columns selected from the memory core 730. These sense amplifiers may also be referred to as IO sense amplifiers. During the RMW operation, the access unit 740 may differently operate according to the logic level of the mode signal MODE, that is, according to the first and second modes, which will be described in detail with reference to FIGS. 8 to 11.

The error correction code generation circuit 750 may generate an error correction code ECC based on the data DATA" during a write operation of writing the data DATA" into the memory core 730. That is, the error correction code generation circuit 750 may generate, by encoding the data DATA", an error correction code ECC for correcting an error of the data DATA" during a read operation of reading the data DATA" from the memory core 730. During a write operation, only the error correction code ECC may be generated but the error correction operation may not be performed. Therefore, the data DATA" input to the error correction code generation circuit 750 and the data DATA" output from the error correction code generation circuit 750 may be the same.

The error correction circuit 760 may correct an error of the data DATA" that are read from the memory core through the access circuit 740 based on the error correction code ECC that is read from the memory core through the access circuit 740 during a read operation. Here, "correcting an error" may mean detecting an error of the data DATA" based on the error correction code ECC and, when the error is detected, correcting it.

During a RMW operation, the first modify circuit 770 may generate the DATA" to be written by combining the write data WR DATA transferred from the outside of the memory 700 and data DATA' that are error-corrected from the data DATA" read from the memory 700. During a normal write operation and a normal read operation which are not a RMW operation, data may bypass the first modify circuit 770. During a normal write operation, the data DATA and the data DATA" may be the same, and during a normal read operation, the data DATA' and the data DATA may be the same.

The second modify circuit 780 may operate when the second mode is set, and may generate the data to be stored in the memory core 730 during a RMW operation of the second mode by combining the data DATA" generated by the first modify circuit and the data DATA" read from the memory core 730.

Since the error correction code ECC is stored in the memory core 730 of the memory 700 supporting the RMW operation, it may be preferable that initialization data (e.g., '0') are written in all regions of the memory core 730 during an initialization operation of the memory 700.

Figure 8:
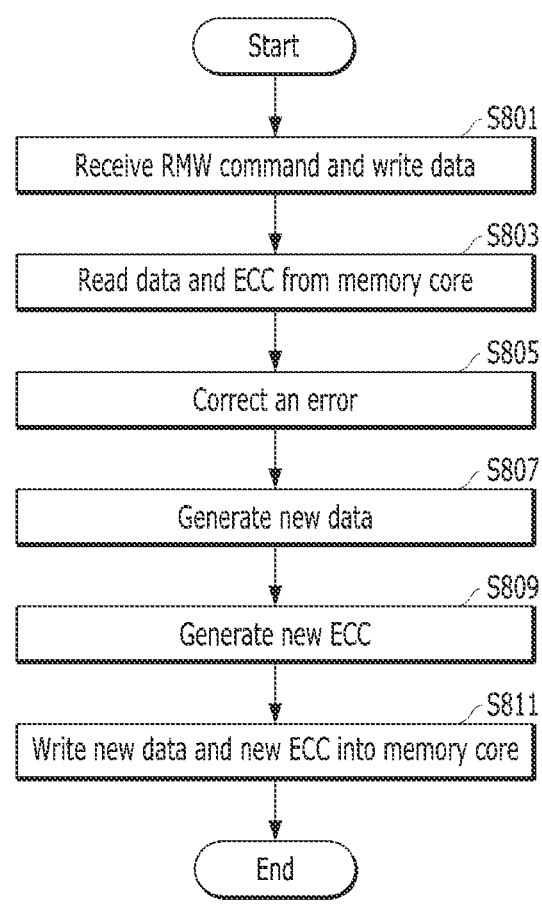
FIG. 8 is a flowchart describing a read modify write (RMW) operation of the memory 700 when the first mode is set by a setting circuit 720.

FIG. 8 is a flowchart describing a RMW operation of the memory 700 when the first mode is set by the setting circuit 720. FIG. 9 describes the first mode of the RMW operation.

Referring to FIGS. 8 and 9, a command CMD directing a RMW operation and write data WR DATA may be applied to the memory 700 in operation S801. The command CMD may be transferred to the command decoder 710 through the command receiving circuit 701, and the command decoder 710 may decode the command CMD to identify the command CMD as directing the RMW operation. The write data WR DATA may be received by the data receiving circuit 705. An address ADD for designating a region in which a RMW operation is to be performed in the memory core 730 may be received through the address receiving circuit 703.

The data DATA" and the error correction code ECC may be read from the memory core 730 in operation S803. A region to be accessed in the memory core 730 may be selected based on the address ADD, and the data DATA" and the error correction code ECC may be read from the selected region of the memory core 730 through the access circuit 140. In FIG. 9, '901' may represent the data DATA" that are read from the selected region of the memory core 130 and the error correction code ECC. Referring to '901' of FIG. 9, it may be seen that the data DATA" include two messages MSG0 and MSG1 each of which includes 128 bits, and the error correction code ECC includes 32 bits.

An error of the data DATA" may be corrected based on the error correction code ECC in operation S805. The error correction circuit 760 may correct an error of the data DATA" based on the error correction code ECC transferred from the access circuit 740. In FIG. 9, '903' may represent error-corrected data DATA'.

A portion of the error-corrected data DATA' may be replaced with the write data WR DATA to generate new data DATA" in operation S807. The modify circuit 770 may generate the new data DATA" based on the error-corrected data DATA' and the write data WR DATA input from the outside of the memory. Since other data DATA" that are different from the data DATA' are generated by the modify circuit 770, this other data DATA" is referred to as new data DATA". In FIG. 9, '905' may represent new data DATA". Referring to '905', it may be seen that the new data DATA" are generated by replacing the error-corrected message MSG0' of the error-corrected data DATA' with the write data WR DATA. Here, the write data WR DATA may be received through the data receiving circuit 705 in the operation S801. During a normal write operation, the write data WR DATA input from the outside of the memory 700 may be 256 bits, but during a modify write operation, the write data WR DATA may be 128 bits.

In operation S809, a new error correction code ECC may be generated based on the new data DATA" of operation S807. The error correction code generation circuit 750 may generate the new error correction code ECC based on the new data DATA" generated by the modify circuit 770 in operation S807. Here, since another error correction code is newly generated based on the new data, this another error correction code is referred to as the new error correction code ECC. In FIG. 9, '907' may represent new data DATA" and a new error correction code ECC generated based on the new data DATA" in operation S809.

Now, the new data DATA" and the new error correction code ECC may be written into the memory core 130 in operation S811. The new data DATA" and the new error correction code ECC may be transferred to the memory core 730 by the access circuit 740, and the new data DATA" and the new error correction code ECC may be written into the region of the memory core 730 which is selected based on the address ADD. The region in the memory core 730 that is written in the operation S811 may be the same as the region in the memory core 730 that is read in the operation S903.

Since the RMW operation in the first mode of the memory 700 is performed in the same manner as the RMW operation in the first mode of the memory 100 is performed, it may cause a problem of increasing the errors when there are many errors.

Figure 10:
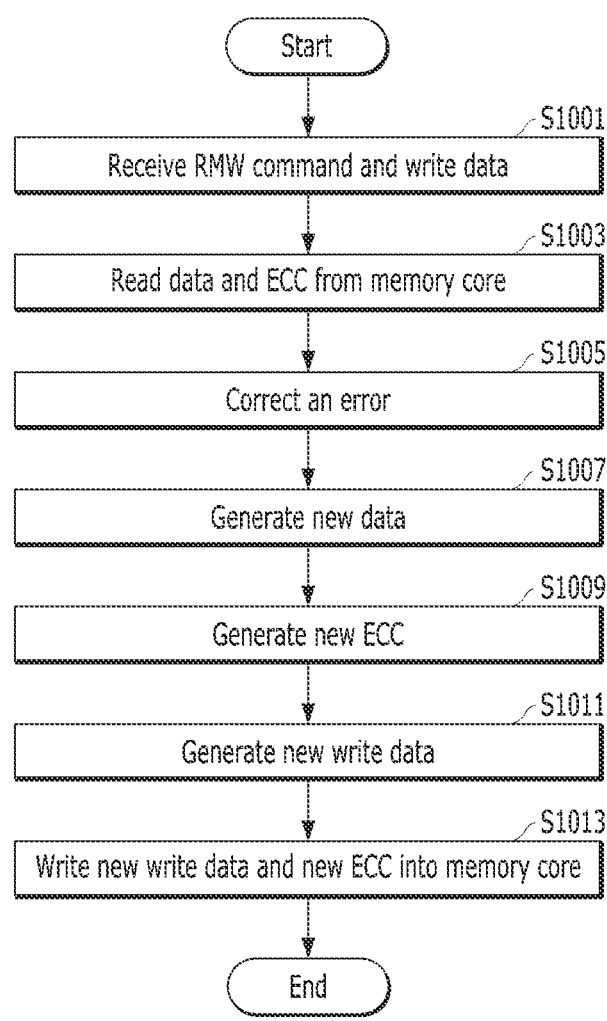
FIG. 10 is a flowchart describing a RMW operation of the memory 700 when a second mode is set by the setting circuit 720.

FIG. 10 is a flowchart describing a RMW operation of the memory 700 when a second mode is set by the setting circuit 720. FIG. 11 describes the second mode of the RMW operation.

Referring to FIGS. 10 and 11, a command CMD directing a RMW operation and write data WR DATA may be applied to the memory 700 in operation S1001. The command CMD may be transferred to the command decoder 710 through the command receiving circuit 701, and the command decoder 710 may decode the command CMD to identify the command CMD as directing the RMW operation. The write data WR DATA may be received by the data receiving circuit 705. The address ADD for designating a region in which a RMW operation is to be performed in the memory core 730 may be received through the address receiving circuit 703.

The data DATA" and the error correction code ECC may be read from the memory core 730 in operation S1003. A region to be accessed in the memory core 730 may be selected based on the address ADD, and the data DATA" and the error correction code ECC may be read from the selected region of the memory core 730 through the access circuit 740. In FIG. 11, '1101' may represent the data DATA" that are read from the selected region of the memory core 730 and the error correction code ECC. Referring to '1101' of FIG. 11, it may be seen that the data DATA" include two messages MSG0 and MSG1 each of which includes 128 bits, and the error correction code ECC may include 32 bits.

An error of the data DATA" may be corrected based on the error correction code ECC in operation S1005. The error correction circuit 760 may correct an error of the data DATA" based on the error correction code ECC transferred from the access circuit 740. In FIG. 11, '1103' may represent the error-corrected data DATA'.

A portion of the error-corrected data DATA' may be replaced with the write data WR DATA to generate new data DATA' in operation S1007. The modify circuit 770 may generate the new data DATA" based on the error-corrected data DATA' and the write data WR DATA input from the outside of the memory 700. Since other data DATA" that are different from the data DATA' are generated by the modify circuit 770, this other data DATA" is referred to as new data DATA". In FIG. 11, '1105' may represent the new data DATA". Referring to '1105', it may be seen that the new data DATA" are generated by replacing the error-corrected message MSG0' of the error-corrected data DATA' with write data WR DATA. Here, the write data WR DATA may be received through the data receiving circuit 705 in operation S1001. During a normal write operation, the write data WR DATA input from the outside of the memory 700 may be 256 bits, but during a modify write operation, the write data WR DATA may be 128 bits.

In operation S1009, a new error correction code ECC may be generated based on the new data DATA" of operation S1007. The error correction code generation circuit 750 may generate a new error correction code ECC based on the new data DATA" generated by the modify circuit 770 in operation S1007. In this case, since another error correction code is newly generated based on the new data, this another error correction code is referred to as the new error correction code ECC. In FIG. 11, '1107' may represent the new data DATA" and the new error correction code ECC generated based on the new data DATA" in operation S1009.

New write data NEW_WR_DATA may be generated in operation S1011 based on the new data DATA", which are generated in the operation S1009, and the read data DATA", which are read in the operation S1003. The second modify circuit 780 may generate the new write data NEW_WR_DATA by replacing, with the message MSG1 that is read in the operation S1003, the error-corrected message MSG1' other than the write data WR DATA within the new data DATA" generated by the first modify circuit 770. In FIG. 11, '1109' may represent new write data NEW_WR_DATA generated by replacing the error-corrected message MSG1' of the new data DATA" with the message MSG1 read in operation S1003. That is, it may be seen that the message MSG1 read in operation S1003 is secured rather than being error-corrected within the new write data NEW_WR_DATA.

The new write data NEW_WR_DATA and the new error correction code ECC may be written into the memory core 730 in operation S1013. Since the second mode is set by the setting circuit 720, the access circuit 740 may write the new write data NEW_WR_DATA, which are not the new data DATA", and the new error correction code ECC into the memory core 730.

As illustrated in FIGS. 10 and 11, when the second mode is set, data that are read from the memory core 730 during a RMW operation may be written back to the memory core 730 as they are. Therefore, it may be possible to prevent the phenomenon that errors are accumulated and increasing by the execution of a RMW operation.

When there are a few errors in the data stored in the memory core 730, it may be advantageous to perform a RMW operation in the first mode. When there are many errors in the data stored in the memory core 730, it may be advantageous to perform a RMW operation in the second mode.

According to the embodiment of the present invention, the number of errors may be reduced.

While the present invention has been described with respect to the specific embodiments, it will be apparent to those skilled in the art that various changes and modifications may be made without departing from the spirit and scope of the invention as defined in the following claims.

What is claimed is:

1. A method for operating a memory, comprising:
   reading data and an error correction code from a memory core;
   correcting an error of the read data based on the read error correction code to produce error-corrected data;
   generating new data by replacing a portion of the error-corrected data with write data, the portion becoming a write data portion;
   generating a new error correction code based on the new data;
   writing the new data and the new error correction code into the memory core when a first mode is set; and
   writing the write data portion of the new data and the new error correction code into the memory core when a second mode is set.

2. The method of claim 1, wherein the writing includes discarding a remaining portion of the new data other than the write data portion.

3. The method of claim 2, further comprising, before the reading:
   receiving a read modify write (RMW) command; and
   receiving the write data.

4. The method of claim 3, further comprising determining whether to perform the discarding during a RMW operation, before the receiving of the RMW command.

5. A method for operating a memory, comprising:
   reading first data, second data and an error correction code from a memory core;
   correcting an error of the read first data and the read second data based on the read error correction code;
   generating new data by combining the second data whose error is corrected, and write data;
   generating a write data portion replacing a portion of the second data whose error is corrected with write data;
   generating a new error correction code based on the new data;
   writing the write data, the read second data, and the new error correction code into the memory core;
   writing the new data and the new error correction code into the memory core when a first mode is set; and
   writing the write data portion of the new data and the new error correction code into the memory core when a second mode is set.

6. The method of claim 5, further comprising, before the reading:
   receiving a read modify write (RMW) command; and
   receiving the write data.

7. The method of claim 6, further comprising determining whether to write the read second data into the memory core during a RMW operation, before the receiving of the RMW command.

8. A memory, comprising:
a memory core;
an access circuit suitable for accessing the memory core;
an error correction circuit suitable for correcting an error;
an error correction code generation circuit suitable for generating an error correction code; and
a modify circuit suitable for modifying data,
wherein, during a read modify write (RMW) operation:
the error correction circuit corrects an error of data read from the memory core based on the error correction code that is read from the memory core through the access circuit;
the modify circuit generates new data by replacing, with write data, a portion of the read data whose error is corrected by the error correction circuit, the portion becoming a write data portion;
the error correction code generation circuit generates a new error correction code based on the new data;
the access circuit writes the new data and the new error correction code into the memory core when a first mode is set; and
the access circuit writes the write data portion of the new data and the new error correction code into the memory core when a second mode is set.

9. The method of claim 8, wherein when the second mode is set, the access circuit discards a remaining portion of the new data other than the write data portion.

10. The method of claim 8, further comprising:
a command decoder suitable for decoding a command; and
a data receiving circuit suitable for receiving the write data.

11. The method of claim 10, further comprising a setting circuit suitable for setting the first mode and the second mode.

12. The method of claim 8, wherein the access circuit is further suitable for writing initialization data into the memory core when the memory is initialized.

13. A memory, comprising:
a memory core;
an access circuit suitable for accessing the memory core;
an error correction circuit suitable for correcting an error;
an error correction code generation circuit suitable for generating an error correction code; and
a first modify circuit and a second modify circuit suitable for modifying data,
wherein, during a read modify write (RMW) operation:
the error correction circuit corrects errors of first data and second data that are read from the memory core based on the error correction code that is read from the memory core through the access circuit;
the first modify circuit generates new data by combining the second data, whose errors are corrected by the error correction circuit, with write data;
the error correction code generation circuit generates a new error correction code based on the new data,
the access circuit writes the new data and the new error correction code into the memory core when a first mode is set,
the second modify circuit generates new write data by combining the write data with the read second data when a second mode is set,
the access circuit writes the new write data and the new error correction code into the memory core when the second mode is set.

14. The method of claim 13, further comprising:
a command decoder suitable for decoding a command; and
a data receiving circuit suitable for receiving the write data.

15. The method of claim 14, further comprising a setting circuit suitable for setting the first mode and the second mode.

16. An operating method of a memory, the operating method comprising:
reading, respectively from first to third regions, first and second pieces of data and a first error correction code (ECC) generated on the basis of an original version of the first and second pieces;
performing, based on the first ECC, an error-correcting operation on the first and second pieces to generate third and fourth pieces of data respectively corresponding to the first and second pieces;
generating a second ECC based on the fourth piece and a fifth piece of data corresponding to the first piece;
writing, respectively into the first and third regions, the fifth piece and the second ECC without writing the fourth piece into the second region when a first mode is set; and
writing the fourth piece and the second ECC into the second region when a second mode is set.

17. The operating method of claim 16, wherein the writing includes masking the fourth piece.

18. The operating method of claim 16, wherein the writing includes writing the second piece back into the second region.

* * * * *